Dec. 24, 1935.   F. A. STATZ   2,025,536
MACHINE TOOL
Filed Dec. 14, 1934

Inventor
F. A. Statz
By V. F. Larocque
Atty.

Patented Dec. 24, 1935

2,025,536

UNITED STATES PATENT OFFICE 2,025,536

MACHINE TOOL

Frank A. Statz, Fort Wayne, Ind., assignor to International Harvester Company, a corporation of New Jersey Application December 14, 1934, Serial No. 757,442

10 Claims. (Cl. 10—140)

This invention relates to a machine tool. More specifically it relates to a machine tool for a simultaneous tapping and spot facing operation.

It is often desirable when tapping a hole that the plane of the surface immediately surrounding the tapped hole be absolutely perpendicular to the center line of the hole. Heretofore, it has been extremely difficult to spot-face the aforementioned surface square with the tapped hole because of misalignment of the parts due to removal of the parts from their holding fixtures for two or more operations. Another difficulty is encountered in the top edge of the tapped hole becoming turned in upon the threaded portion by the spot facing tool.

An object of the present invention is to provide a machine tool in which a tapping and a spot facing tool are held in vertical alignment for performing both the tapping and spot facing operations while the part to be machined is still in the same holding fixture.

Another object is to provide a machine tool in which the tapping operation is automatically stopped while the spot facing operation continues.

Another object is to provide a machine tool that is compact and simple in construction, yet performing both tapping and spot facing operations accurately.

These objects and others will be apparent from the detailed description of the preferred embodiment of the invention shown in the accompanying drawing, in which.

Figure 1:
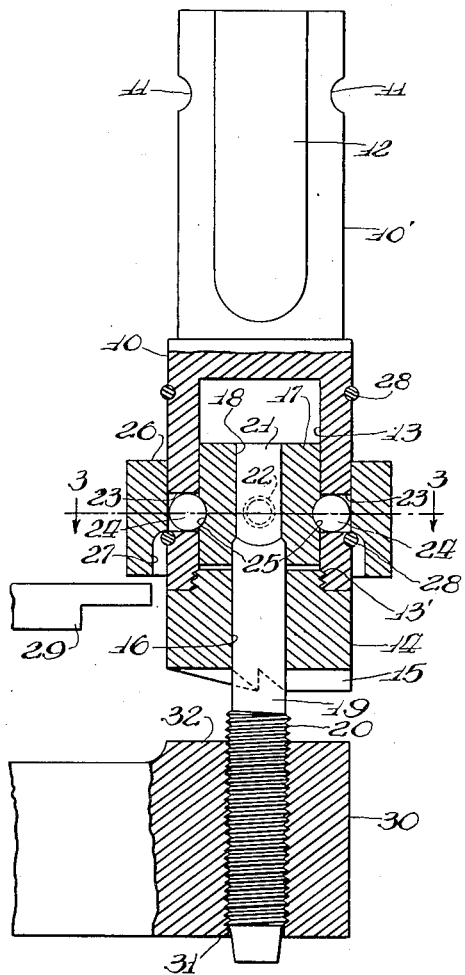
Figure 1 is a vertical cross section of the tool in the tapping operation.

As shown in the drawing the machine tool is provided with an elongated, cylindrical shank 10, having an upper driving portion 10' slightly smaller in diameter, into which are cut diametrically opposed recesses 11 and, along one side thereof, a flat portion 12.

Said recesses 11 and the flat portion 12 are of the same standard construction embodied in most machine tools, drill bits, and the like, for adapting said tools to be held in driving engagement with a standard drill press chuck, as is well understood by those skilled in the art.

At its lower end, the shank 10 is provided with an axial bore 13, having adjacent its lower end a threaded portion 13', into which is threaded for driving engagement a cutting means, such as a spot facing tool 14. Said spot facing tool is provided with cutting edges 15 and a central vertical bore 16 for purposes to appear later.

Within the bore 13, and above the threaded portion 13', is slidably and rotatably mounted a tap holding member 17 provided with a square hole or opening 18 in axial alignment with the bore 16 in the spot facing tool 14.

A second cutting means, such as a tapping tool 19, having a tapping or threading portion 20 at its lower end, is provided at its upper end with a square shank 21. The tapping tool is fitted upwardly through the bore 16 in the spot facing tool 14 and into the tap holding member 17, where the square shank 21 fits into the square hole 18, said tapping tool being securely held in driving engagement and against dropping out by set screws 22.

Adjacent its lower end and communicating with the vertical bore 13, the shank 10 is provided with a pair of radially extending, diametrically opposed bores 23 for holding a pair of latch members, such as steel balls 24, which balls 24 fit partially into a pair of diametrically opposed, shallow recesses 25 in the tap holding member 17.

An annular stop member, such as the collar 26, slidably and rotatably encircles the lower portion of the shank 10, and, in the position shown in Figure 1, confines the balls 24 to the bores 23 in the shank 10 and to the recesses 25 in the tap holding member 17.

Figure 2:
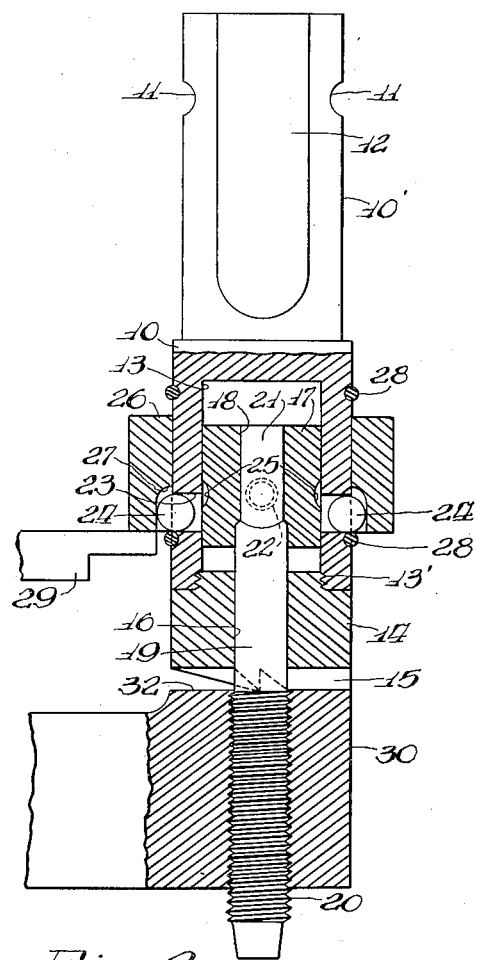
Figure 2 is a similar view of the same tool in the spot facing operation.
Figure 3:
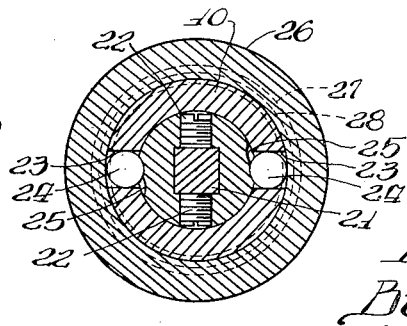
Figure 3 is a horizontal cross section taken on the line 3—3 of Figure 1, looking in the indicated direction.

The collar 26 is provided at its lower and inner surfaces with an annular recess 27 for releasing the balls 24 from the recesses 25 in the tap holding member 17, when the collar 26 is in the position shown in Figure 2.

The shank 10 is provided with circumferential grooves spaced vertically apart a predetermined distance, into each of which grooves is fitted a spring wire ring 28 to provide means for limiting the axial movement of the collar 26 for a purpose later to be described.

The conventional drill press frame, not shown, is provided with a stop member 29 adapted to engage the collar 26. The work or part to be tapped and spot-faced is indicated at 30, having been previously drilled or bored, as at 31, and said work or part is rigidly secured to the base plate of the drill press in the customary manner. The surface to be spot-faced is indicated at 32.

In operation, the upper driving portion 10' of the shank 10 is thrust upwardly into the chuck of the drill press, where it is held against dropping downwardly by the recesses 11 engaging means within the drill press chuck, and is held for rotation with the chuck by engagement between the flat portion 12 of the shank 10 and a corresponding flat portion within the chuck, all of which is conventional construction.

The part 30, having been previously drilled or bored at 31, is secured to the base plate of the drill press with the bore 31 in vertical alignment with the tapping tool 19, and with the plane of the surface 32 substantially parallel to the plane of the cutting edges 15 of the spot facing tool 14.

As is well understood by those skilled in the art, means are provided on the drill press for lowering the tool within operating proximity of the work, and thus the end of the tapping tool 19 is entered into the bore 31 of the work or part 30.

As shown in Figure 1, while the tapping tool 19 is threading the bore 31, the collar 26 holds the tap holding member 17 for rotation with the shank 10 of the machine tool by confining the balls 24 to the recesses 25 in the tap holding member, said collar 26 being prevented from further downwardly axial movement by the upper rounded edge of the annular recess or cut-out portion 27 abutting the lower spring wire ring 28.

When the threaded portion 20 of the tapping tool 19 has completely threaded the bore 31, the stop member 29 engages the collar 26, holding said collar in the same relative position to said stop member while the machine tool is permitted to travel downwardly.

As shown in Figure 2, as the cutting edges 15 of the spot facing tool 14 contact the surface 32 of the work or part 30, the machine tool has progressed sufficiently downwardly to allow the balls 24 to move outwardly in the bores 23 from the recesses 25 in the tap holding member 17, into the annular recess or cut-out portion 27 of the collar 26, thus interrupting the driving engagement between the shank 10 and the tapping tool 19.

In the preferred embodiment of the invention herein described and illustrated, two steel balls have been used to establish a driving engagement between the machine tool and the tapping tool; however, it will be understood that one ball, latching pawls, or other means will serve to accomplish the same end.

It will be apparent from further examination of Figure 2 that the spot facing operation may continue after the tapping operation has been automatically stopped, until the cutting edges 15 of the spot facing tool 14 have cut the surface 32 of the work or part 30 to the desired dimensions. The collar 26 is limited against further upward movement by the upper spring wire ring 28. The spring wire rings 28 may be easily removed at any time, should removal of balls 24 be necessitated.

After the spot facing operation is completed, the drill press chuck is reversed and raised, along with the shank 10, and the spot facing tool 14 is retrieved from the now accurately spot-faced surface 32 of the work or part 30. When the shank 10 is raised a sufficient distance, the collar 26 drops downwardly and the upper rounded surface of the annular recess or cut-out portion 27 of said collar drops over the balls 24, forcing them through the bores 23 in the shank 10 and back into the recesses 25 of the tap holding member 17.

In this manner the tapping tool 19 is again held for rotation with the shank 10, and, because of the reverse rotation of the shank 10, the threaded portion 20 of the tapping tool 19 is unthreaded from the now threaded bore 31 in the work or part 30.

It will be readily understood from the previous description of the invention that, with the tapping tool 19 always in position in the bore 31 of the work or part 30, and extending axially through the opening 16 in the spot facing tool 14, the cutting edges 15 of said spot facing tool must always operate in a plane perpendicular to the axis of the tapping tool 19 and the bore 31, thus machining the surface 32 to the desired perfection.

In the preferred embodiment of the invention herein given, the machine tool and shank 10 are shown as operating in a vertical position. However, as may be readily seen by those skilled in the art, the invention would operate on a horizontal axis, such as in a lathe, or, by employing a special driving portion on the shank, in a milling machine. It is further apparent that the machine tool described above may be operated at any convenient angle.

What is claimed is:

1. In a machine tool, a shank, cutting means carried thereby, a second cutting means rotatably and slidably carried by said shank for relative axial movement therewith, latch means between the shank and the second cutting means, a stop member mounted on said shank for engaging and locking said latch means with the second cutting means and the shank, and stop means for abutting said stop member for releasing the latch means.

2. In a machine tool, a shank, an annular spot facing member carried thereby, a thread tapping member rotatably and slidably carried by said shank and extending through said spot facing member and axially therebeyond for relative axial movement therewith, latch means between the shank and the thread tapping member, a member mounted on the shank for engaging and locking said latch means with the thread tapping member and the shank, and stop means for abutting said member to release the latch means.

3. In a machine tool, a shank, an annular spot facing member carried thereby, a thread tapping member rotatably and slidably carried by said shank and slidably extending through said spot facing member and axially therebeyond, latch means between the shank and the thread tapping member, a stop member mounted on the shank for engaging and locking said latch means with the thread tapping member and the shank, and stop means for abutting said stop member to release the latch means.

4. In a machine tool, a shank, cutting means carried thereby, a second cutting means rotatably and slidably carried by said shank and slidably mounted with respect to the first cutting means, latch means between the shank and said second cutting means, a stop member slidably mounted on said shank for engaging and locking said latch means with the second cutting means and the shank, and stop means for abutting said stop member to release the latch means.

5. In a machine tool, a shank, cutting means carried thereby, a second cutting means rotatably and slidably carried by said shank and slidably mounted with respect to the first cutting means, latch means between the shank and said second cutting means, a stop member slidably mounted on said shank for engaging and locking said latch means with the second cutting means and the shank, stop means for abutting said stop member to release the latch means, and means carried by the shank for limiting the movement of said stop member.

6. In a machine tool, a shank, said shank being formed with an axial bore, cutting means carried by said shank, a second cutting means rotatably and slidably carried within the axial bore of said shank and slidably mounted with respect to the first cutting means, latch means between the shank and the second cutting means, an annular stop member slidably surrounding said shank for engaging and locking said latch means with the second cutting means and the shank, and stop means for abutting said annular stop member for releasing the latch means.

7. In a machine tool, a shank, said shank being formed with an axial bore, cutting means carried by said shank, a second cutting means rotatably and slidably carried within the axial bore of said shank and slidably mounted with respect to the first cutting means, latch means between the shank and the second cutting means, an annular stop member surrounding said shank for engaging and locking said latch means with the second cutting means and the shank, said annular stop member being formed with an annular recess, stop means for abutting said annular stop member for releasing the latch means into said annular recess, and means carried by the shank for limiting the movement of said annular stop member.

8. In a machine tool, a shank, said shank being formed with an axial bore, cutting means carried by said shank, a second cutting means rotatably and slidably carried within the axial bore of said shank and slidably mounted with respect to the first cutting means, said shank also being formed with a bore communicating with said axial bore, latch means freely movable in said radial bore and engaging the second cutting means, an annular stop member slidably surrounding the shank for holding said latch means in engagement with the second cutting means and the shank, said annular stop member being formed with an annular recess, stop means for abutting said annular stop member to release the latch means into said annular recess, and means carried by the shank for limiting the movement of said annular stop member.

9. In a machine tool, a shank, said shank being formed with an axial bore, cutting means carried by said shank, a second cutting means rotatably and slidably carried within the axial bore of said shank and slidably mounted with respect to the first cutting means, said shank being formed with a radially extending bore communicating with said axial bore, said second cutting means being formed with a recess, latch means freely movable in the radial bore and engaging said recess, an annular stop member slidably surrounding the shank for holding said latch means within the radial bore and into said recess, said annular stop member being formed with an annular recess, stop means for abutting said annular stop member whereby the annular ress accommodates outward movement of the latch means, and means carried by the shank for limiting the axial movement of said stop member.

10. In a machine tool, a shank, said shank being formed with an axial bore, cutting means carried by said shank, a second cutting means rotatably and slidably carried within the axial bore of said shank and slidably mounted with respect to the first cutting means, said shank also being formed with a radial bore communicating with the axial bore, said second cutting means being formed with a recess, latch means freely movable in the radial bore and engaging said recess, an annular stop member mounted on the shank for reciprocation over the radial bore to hold the latch means in the recess whereby the second cutting means may be engaged and locked with the shank, said annular stop member being formed with an annular recess, stop means for abutting the annular stop member whereby said annular recess accommodates outward movement of the latch means from the recess in the second cutting means to disengage said second cutting means from the shank, and means carried by said shank for limiting reciprocation of the stop member.

FRANK A. STATZ.